United States Patent [19]
Krespan et al.

[11] Patent Number: 6,025,521
[45] Date of Patent: Feb. 15, 2000

[54] TELOMERIZATION PROCESS FOR TELOMERIZING ETHYLENIC MONOMER COMPOUNDS

[75] Inventors: Carl George Krespan; Viacheslav Alexandrovich Petrov, both of Wilmington, Del.

[73] Assignee: E. I. du Pont de Nemours and Company, Wilmington, Del.

[21] Appl. No.: 08/854,207

[22] Filed: May 9, 1997

Related U.S. Application Data

[60] Continuation of application No. 08/427,331, Apr. 24, 1995, abandoned, which is a division of application No. 08/249,764, May 26, 1994, Pat. No. 5,459,212.

[51] Int. Cl.[7] .......................... C07C 69/653; C07C 41/30
[52] U.S. Cl. ..................... 560/219; 568/685; 568/909.5; 570/126
[58] Field of Search ..................................... 560/223, 219; 568/909.5, 685; 570/125, 126; 585/510

[56] References Cited

U.S. PATENT DOCUMENTS 3,704,285  11/1972  Porter .
4,035,434  7/1977   Rodewald .
4,116,880  9/1978   Olah .
4,908,198  3/1990   Weinberg .

OTHER PUBLICATIONS

Nakajima, T. et al., Carbon, 24, 343–351 (1986).

*Primary Examiner*—Christopher Henderson

[57] ABSTRACT

This invention relates to carbon based initiators for polymerization and telomerization reactions. Polymers produced are useful as water repellants and materials with high temperature resistance. Telomers are useful as intermediates in the production of chemically inert and temperature resistant materials.

11 Claims, No Drawings

TELOMERIZATION PROCESS FOR TELOMERIZING ETHYLENIC MONOMER COMPOUNDS

This case is a File Wrapper Continuation of application Ser. No. 08/427,331, filed Apr. 24, 1995, now abandoned, which is a divisional of application Ser. No. 08/249,764, filed May 26, 1994 which has issued as U.S. Pat. No. 5,459,212.

FIELD OF THE INVENTION

This invention relates to carbon based initiators for polymerization and telomerization reactions of vinyl monomers.

TECHNICAL BACKGROUND

Intercalates with graphite and fluorographites have been used to catalyze cationic reactions, including polymerization, of nonfluorinated substrates. Applicants have located no reference to the use of fluorographites or fluorinated carbons as polymerization or telomerization initiators.

SUMMARY OF THE INVENTION

This invention concerns a polymerization or telomerization process for preparing polymers or telomers from vinyl monomers comprising polymerizing or telomerizing vinyl monomers in the presence of an initiator comprising a fluorinated carbon and in the optional presence of a solvent.

Specifically, the invention concerns a polymerization process for preparing polymers and oligomers from vinyl monomers of the structure $X_2C=CYZ$, where X is selected from the group consisting of H and F, Y is selected from the group consisting of H, F, and $CH_3$, and Z is selected from the group consisting of H, F, $OR_f'$, Cl, $CH_2OH$, $R_f'$, R, and $CO_2R'$, wherein $R_f'$ is a perfluoroalkyl of 1 to 4 carbon atoms; R is alkyl of 1 to 4 carbon atoms and R' is alkyl or polyfluoroalkyl of 1 to 4 carbon atoms; comprising polymerizing said vinyl monomers in the presence of fluorinated carbons, in the optional presence of a solvent.

"Fluorinated carbons" include fluorographites and fluorinated cokes, as well as graphite or fluorographite intercalated with $SbF_5$, $VF_5$ or $F_2$. The reaction temperature range is $-10°$ C. to $250°$ C., depending upon the reactants.

By "oligomer" herein is meant a polymer made of two, three or four monomer units.

DETAILS OF THE INVENTION

In the polymerization of vinyl monomers solvent is generally not needed. However, in certain cases solvent may be useful. Suitable solvents for these processes are stable under reaction conditions, and include polyfluorinated ethers, perfluoroethers, polyfluoroalkanes, and perfluoroalkanes, such as perfluorodimethylcyclobutane (also referred to as F-dimethylcyclobutane), $CF_3CF_2CF_2OCHFCF_3$, perfluorobutyltetrahydrofuran, perfluoro-n-hexane, $CFCl_2CF_2Cl$, and $CF_3CHFCHFCF_2CF_3$. Where the abbreviation "F-" appears in the specification, it denotes "perfluoro". Excess telogen may also serve as the solvent.

Fluorinated carbons, including fluorographites and fluorinated cokes, and graphites or fluorographites intercalated with $SbF_5$, $VF_5$ or $F_2$ initiate a variety of polymerizations and telomerizations. The fluorographites are especially useful herein in that products such as polytetrafluoroethylene (PTFE), tetrafluoroethylene/hexafluoropropene copolymer (FEP), tetrafluoroethylene/perfluoro(propyl vinyl ether) (PFA), $R_fI$ (Telomer A), and $R_fCH_2CH_2I$ (Telomer B) are formed cleanly and in good conversion. $R_f$ is a perfluoroalkyl of 1 to 10, preferably 1 to 4, carbon atoms.

Fluorinated carbons are prepared by fluorination of various forms of carbon, including carbon blacks, cokes and graphites. Many of these forms are commercial products. For example, Allied Corporation provides under the Accufluor® trademark $CF_x$, Series 1000, based on the reaction of a coke feedstock with elemental fluorine at high temperature to incorporate up to about 63 wt % of fluorine and corresponding to the composition of $CF_{1.08}$. Another of Allied Corporation's Accufluor® $CF_x$, Series 2000 is based upon fluorination of conductive black to give 11–65% fluorine content, or $CF_{0.08}$—$CF_{1.17}$ in empirical formula. Ozark-Mahoning provides Fluorographite® products of the approximate composition range 27–63.5 wt % fluorine, or $CF_{0.25}$—$CF_{1.17}$, while their coke based carbon monofluoride product has a composition of $CF_{0.9}$—$CF_{1.05}$.

The carbon being fluorinated can be of various shapes such as powder, large particles or fibers. Fluorination can be carried out to various levels of fluorine content in the catalyst by controlling variables in the fluorination process, especially the ratio of fluorine to carbon reactants, temperature, and time. Graphite in which fluorine gas is intercalated, rather than covalently bound, can also be prepared. Nakajima, T.; Watanabe, N.; Kameda, I.; Endo, M., Carbon, 1986, Vol. 24, 343–351 describe these processes.

The polymerization or telomerization results in formation of products varying in size and molecular weight from high polymers to 1:1 telogen/olefin adducts. Telomerization is a process yielding a low molecular weight polymer consisting of a chain of a limited number of units terminated at each end by a radical of a different compound (the telogen). See Oxford English Dictionary, Second Ed., Clarendon, Oxford, 1989. The telomerization reaction proceeds as a polymerization reaction between two substances providing respectively the terminal groups and internal linkages of the resulting telomer molecule; e.g., $CCl_4+CH_2CH_2\rightarrow Cl(CH_2CH_2)_nCCl_3$. See also Hackh's Chemical Dictionary, 1969, McGraw Hill, Inc., p. 664. Vinyl monomers and comonomers used for polymerizations include but are not limited to, $CF_2=CF_2$, $CF_2=CFCF_3$, $CF_2=CFOCF_2CF_2CF_3$, $CF_2=CFOCF_3$, $CF_2=CH_2$, $CH_2=CHCO_2CH_3$, $CH_2=C(CH_3)CO_2CH_3$, $CH_2=C(CH_3)CO_2CH(CF_3)_2$, $CH_2=CHCO_2CH(CF_3)_2$ and $CH_2=CH_2$. Those used for telomerizations are $CF_2=CF_2$, $CF_2=CFCl$, $CF_2=CHF$, $CF_2=CH_2$, $CH_2=CH_2$, $CH_2=CHCH_3$, $CH_2=CHCH_2OH$, and $CH_2=CHC_4F_9$. Included are monomers of the general formula $X_2C=CYZ$, where X=H or F, Y=H, F or (in some cases) $CH_3$, and Z=H, F, $OR_F$, Cl, $CH_2OH$, $R_f'$, R, or $CO_2R'$ where $R_f'$ is perfluoroalkyl of 1 to 4 carbon atoms, R is alkyl of 1 to 4 carbon atoms, and R' is alkyl or polyfluoroalkyl of 1 to 4 carbons.

Telogens suitable herein are of the general formulas RH, RI, RBr and RCl, where R can be hydrocarbyl or polyhaloalkyl, including, for example, $CF_3CF_2I$, $CF_3CF_2CF_2I$, $C_2F_5I$, $F(CF_2)_4I$, $F(CF_2)_6I$, $F(CF_2)_8I$, $(CF_3)_2CFI$, $BrCF_2CFClBr$, $CF_2Br_2$, $CCl_4$, methylcyclohexane, $CF_3OCF_2CF_2I$, $C_3F_7OCF_2CF_2I$, $ClCF_2CFClI$, $I(CF_2)_3I$, $I(CF_2)_4I$ and $BrCF_2CF_2Br$.

In a preferred embodiment of the process, the telogen is $F(CF_2)_nI$, where n is 2 to 8, and the monomer is TFE or ethylene.

Initiator compositions can vary. Carbons fluorinated from a low level (e.g. 4.5% surface fluorinated graphite fibers) to high levels (e.g. 63% F from coke and 65% from conductive carbon) have been shown to serve as initiators herein. Furthermore, intercalates of $SbF_5$ with graphites as well as with fluorographites have been shown to be even more active than the parent fluorographites as initiators of fluoroolefin reactions. Intercalates with other materials (e.g., $VF_5$, $F_2$) also serve as initiators.

Carbon-reinforced polymeric products are obtained directly. Advantages of the present catalysts for telomerizations to make liquid and/or organic-soluble products include the use of easily isolated initiators which can be reused/regenerated and the ready adaptability to flow reactors. The fluorographite and fluorinated carbon initiators have been shown to remain active after storage under ambient conditions for long periods of time and are thus convenient to use.

Reaction temperature can vary from $-10°$ C. to $250°$ C. for polymerizations with the fluorinated carbons, depending on the reactants, while the intercalates can be used from about $-10°$ C. to about $120°$ C. Reaction temperatures for the telomerizations can vary from $25–150°$ C. Reaction time can be from a few seconds to in excess of one day depending upon variables such as temperature and the reactivity of the monomer(s) employed. Pressures can be subatmospheric to about 100 atmosphere, preferably from 1–100 atmospheres ($10^5$–$10^7$ Pa).

Polymers produced by the polymerization process described herein are useful as water repellants and materials with high temperature resistance. Telomers produced are useful as intermediates in the production of chemically inert and temperature resistant materials.

EXAMPLES

EXAMPLE 1

TFE/PMVE Copolymer with $CF_{0.8}$ Initiator

A 400 mL Hastelloy tube charged with 2.0 g of $CF_{0.8}$, 50 mL of F-dimethylcyclobutane, 66 g (0.4 mol) of $CF_2=CFOCF_3$, and 50 g (0.5 mol) of $CF_2=CF_2$ was agitated at $80°$ C. for 12 hr. The crude grey product was mixed briefly in a blender with 300 mL of methanol, filtered off and dried at $100°$ C. (0.2 mm) to afford 51.6 g of copolymer. Differential Scanning Calorimetry (DSC) indicated the product to be amorphous, while Thermogravimetric analysis (TGA) showed only slight weight loss to $450°$ C. In a melt indexer at $372°$ C. under a 15 kg weight, 1.46 g of tough black copolymer was extruded in 15 min.

EXAMPLE 1A

Reuse of Initiator/Polymer Blend as Initiator

Ten grams of the product from Example 1, calculated to contain 0.4 g of used initiator mixed with 9.6 g of $CF_2=CF_2/CF_2=CFOCF_3$ copolymer, was charged to a 400 mL metal tube along with 66 g (0.4 mol) of $CF_2=CFOCF_3$, 50 g (0.5 mol) of $CF_2=CF_2$, and 50 mL of HFP cyclodimer. The tube was agitated at $100°$ C. for 12 hr. The crude product was dried at $100°$ C. (0.2 mm), yielding 56.4 g of copolymer. Differential Scanning Calorimetry (DSC) showed a mp $286.6°$ C.

EXAMPLE 2

TFE/HFP Copolymer with $SbF_5/CF_{0.25}$ Initiator

A 2.0 g sample of 30 wt % $SbF_5$ on $CF_{0.25}$ was washed twice with F-n-hexane and charged to 400 mL Hastelloy tube along with 50 mL of F-n-hexane, 75 g (0.50 mol) of $CF_2=CFCF_3$, and 50 g (0.50 mol) of $CF_2=CF_2$. Reaction was conducted at $25°$ C. for 4 hr, $50°$ C. for 4 hr, and finally $100°$ C. for 4 hr. The crude product, 135 g, was ground in a blender with 500 mL of methanol, filtered and stripped of volatiles under vacuum, ending at $100°$ C. (0.2 mm) for 4 hr. TGA: no weight loss to $450°$ C. DSC: mp $312.8°$ C. shows the presence of $CF_3CF=CF_2$.

EXAMPLE 3

TFE/PMVE Copolymer with $SbF_5$/Graphite Initiator

A 240 mL metal tube charged with 1.0 g of 72% $SbF_5$ on graphite, 50 mL of F-dimethylcyclobutane, 25 g (0.25 mol) of $CF_2=CF_2$, and 33 g (0.2 mol) of $CF_2=CFOCF_3$ was heated at $80°$ C. for 10 hr to give 96.9 g of crude grey polymer. Removal of volatiles at $100°$ C. (0.2 mm) afforded 38.2 g of grey polymer. TGA showed zero weight loss to $475°$ C. DSC: mp $295.8°$ C. In a melt indexer at $371°$ C. with a 15 kg weight, 0.09 g of tough, dark grey polymer extruded in 15 min.

EXAMPLE 4

TFE Polymer with $SbF_5$/Graphite Initiator in Water Suspension

A 2.0 g sample of 72% $SbF_5$ on graphite was washed well with F-dimethylcyclobutane to remove any exterior $SbF_5$ and charged to a 400 mL Hastelloy tube along with 100 mL of degassed distilled water, 10 mL of F-dimethylcyclobutane, and 50 g (0.50 mol) of $CF_2=CF_2$. The tube was shaken at $25°$ C. for 8 hr, then at $60°$ C. for 4 hr. The grey homopolymer weighed 33.3 g after having been filtered off and dried in a stream of air.

EXAMPLE 5

TFE/$VF_2$ Copolymer with $CF_{0.8}$ Initiator

Two grams of $CF_{0.8}$, 50 mL of F-dimethylcyclobutane, 32 g (0.50 mol) of $CH_2=CF_2$, and 50 g (0.50 mol) of $CF_2=CF_2$ were charged to a 240 mL tube and heated at $120°$ C. for 12 hr. The reaction mixture was filtered and the black polymer so isolated was dried at $100°$ C. (0.2 mm) for 4 hr to give 13.4 g of copolymer. DSC: mp $185.3°$ C.

EXAMPLE 6

Fluorination of Graphite Fiber

Hercules AS1815 graphite fibers cut to ¼ length were extracted repeatedly with methanol to dissolve sizing, then dried under vacuum. A sample of the graphite fibers, 20.5 g or 1.71 g-atom, was charged to a 400 mL Hastelloy tube. The tube was evacuated at $25°$ C. and pressured to 300 psig ($2.07 \times 10^6$ Pa) with 25/75 $F_2/N_2$ (calcd. 0.089 mol, 3.4 g, of $F_2$). The reaction was carried out static at $200°$ C. for 6 hr. Gases were vented and the fibers held at $25°$ C. (0.2 mm) for 4 hr. Anal.: Found, 4.47% F.

EXAMPLE 7

TFE Polymer from Fluorographite Fiber Initiator

Five grams of the surface-fluorinated fiber from Example 6, 50 mL of F-dimethylcyclobutane, and 50 g (0.50 mol) of $CF_2=CF_2$ were reacted in a 240 mL metal tube for 6 hr at 25° C., then 6 hr at 60° C. The resulting moist grey polymer was dried at 100° C. (0.2 mm) for 4 hr to give 54.0 g of polymer-coated fiber.

EXAMPLE 8

TFE Polymer of Limited Molecular Weight

A 400 mL metal tube charged with 175 mL of F-dimethylcyclobutane, 2.0 g of $CF_{0.8}$, 0.9 g of methylcyclohexane, and 40 g (0.40 mol) of $CF_2=CF_2$ was heated at 150° C. for 10 hr. The moist solid product was mixed in a blender with 300 mL of methanol, filtered, and the filter cake was dried for 4 hr at 100° C. (0.2 mm). The resulting high telomer weighed 16.3 g.

EXAMPLE 9

TFE Polymer from $CF_{1.08}$

The fluorinated carbon initiators used in examples above were fluorographites. This example uses fluorinated coke, shown by X-ray diffraction to contain no graphitic structure.

A 240 mL tube charged with 2.0 g of $CF_{1.08}$ from fluorination of coke, 50 mL of F-dimethylcyclobutane, and 50 g (0.50 mol) of $CF_2=CF_2$ was shaken at 25–40° C. for 6 hr. The product was dried at 100° C. (0.2 mm) for 4 hr to afford 49.5 g of white polymer.

EXAMPLE 10

TFE/HFP Copolymer with $CF_{0.25}$ Initiator in Water Suspension

Two grams of $CF_{0.25}$, 100 mL of degassed, distilled water, 75 g (0.50 mol) of $CF_3CF=CF_2$, and 35 g (0.35 mol) of $CF_2=CF_2$ were reacted in a 400 mL tube for 8 hr at 100° C. The dried grey product polymer, 39.1 g, had mp 310.7° C. TGA showed no weight loss to 450° C. and 5% loss to 500° C. In the melt indexer, 0.04 g of tough black polymer was extruded at 372° C. in 15 min with 15 kg weight.

EXAMPLE 11

Telomer A Synthesis with $SbF_5/CF_{0.8}$ Intercalate as Initiator

In a 240 mL stainless steel shaker tube was placed 4 g of 40% $SbF_5$ in fluorographite $CF_{0.8}$ and 100 g (0.29 mol) of $C_4F_9I$ (containing 5% of $C_2F_5I$). The tube was cooled to −78° C., evacuated and loaded with 10 g (0.1 mol) of tetrafluoroethylene (TFE). The reaction vessel was shaken at 80° C. Significant pressure drop (90 psi) was observed in the first 2 hr of the reaction. After 18 hr the shaker tube was unloaded. The crude product (108 g) was filtered, leaving 7 g of solid (initiator coated with PTFE) and 100 g of liquid, which according GC was a mixture of $C_4F_9I$ and telomer iodides $C_4F_9(CF_2CF_2)_nI$ (wt-%): $C_2F_5I$, 5.1; $C_4F_9I$, 76.1; n=1, 11.6; n=2, 4.2; n=3, 1.24; n=4, 0.35; n=5, 0.11. Conversion of TFE was 100%, conversion of $C_4F_9I$ was 19%.

EXAMPLE 12

Telomer A Synthesis with $CF_{0.8}$ Fluorographite as Initiator

In a test as described in Example 10, 4 g of fluorographite $CF_{0.8}$ was used. The reaction vessel was shaken for 18 hr at 120° C. The product was isolated as above. After filtration there was obtained 7.5 g of fluorographite coated with PTFE and 96 g of a mixture of $C_4F_9I$ and telomers $C_4F_9(CF_2CF_2)_nI$ (wt-%): $C_2F_5I$, 4.4; $C_4F_9I$, 75.6; n=1, 11.3; n=2, 4.72; n=3, 1.65; n=4, 0.55; n=5, 0.25; n=6, 0.13; n=7, 0.07. Conversion of TFE was 100%; $C_4F_9I$, 22.4%.

EXAMPLE 13

Telomer B Synthesis with $CF_{0.8}$ Initiator and TFE Co-initiator 4 g of fluorographite $CF_{0.8}$ was placed in a 400 mL stainless steel shaker tube, and the tube was evacuated and charged at −40° C. with 100 g (0.41 mol) of $C_2F_5I$, 10 g (0.36 mol) of ethylene and 5 psig ($3\times10^2$ Pa) of $CF_2=CF_2$ (about 0.3–0.5 g). The reaction vessel was shaken at 80° C. Significant pressure drop (340 psi; i.e. $2\times10^6$ Pa) was observed in the first 2 hr. After 18 hr, the shaker tube was unloaded, the product was filtered and distilled to afford 86 g (87%) of $C_2F_5CH_2CH_2I$.

EXAMPLE 14

Reaction of $CF_2BrCF_2Br$ with $C_2H_4$

In a reaction run as in Example 13, 130 g (0.5 mol) of $BrCF_2CF_2Br$, 4 g of fluorographite $CF_{0.8}$ and 6 g (0.2 mol) of $CH_2=CH_2$ was used. The reaction vessel was shaken at 150° C. After 16 h, the shaker tube was unloaded and the reaction mixture was filtered. There was recovered 4.1 g of initiator and 116 g of the mixture (GC, wt %): $BrCF_2CF_2Br$ (76.5), $CF_2BrCF_2CH_2CH_2Br$ (15.7), $CF_2BrCF_2(CH_2CH_2)_2Br$ (7.4), and $CF_2BrCF_2(CH_2CH_2)_3Br$ (0.35). Conversion of ethylene was 70%.

EXAMPLE 15

$CF_2BrCFClBr/CF_2=CH_2$ Telomers with $CF_{0.8}$ as Initiator

In a reaction similar to Example 14, 104 g (0.38 mol) of $CF_2BrCFClBr$, 4 g of fluorographite $CF_{0.8}$ and 20 g (0.31 mol) of $CF_2=CH_2$ was used. The reaction vessel was shaken at 120° C. for 18 hr. The crude product (analyzed by GC and NMR) was mixture of starting bromide (73.4) and telomers (wt-%) $CF_2BrCFClCH_2CF_2Br$, 16.0; $CF_2BrCFCl(CH_2CF_2)_2Br$, 7.0; $CF_2BrCFCl(CH_2CF_2)_3Br$, 2.2; $CF_2BrCFCl(CH_2CF_2)_4Br$, <1. Conversion of $CF_2BrCFClBr$ was 28%.

Additional polymerization reactions conducted according to the procedure in Example 4 and using catalysts shown in Examples 16–26, below, are described in Table 1.

EXAMPLE 16

$SbF_5/CF_{0.25}$ polymerized tetrafluoroethylene (TFE) in perfluoro-n-hexane.

EXAMPLE 17

Polymerization of TFE was initiated by $CF_{0.25}$ in perfluoro-n-hexane.

EXAMPLE 18

Pure graphite as a catalyst for TFE polymerization up to 80° C. gave a very low conversion to polymer.

EXAMPLE 19

$SbF_5/CF_{0.8}$ was used as an initiator for TFE in the presence of water.

EXAMPLE 20

$CF_{0.8}$ copolymerized $TFE/CH_2=CH_2$ in HFP cyclodimer.

EXAMPLE 21

$CF_{0.8}$ polymerized TFE without solvent.

EXAMPLE 22

$CF_{1.1}$ copolymerized $TFE/CF_2=CFOCF_3$ in HFP cyclodimer. X-ray diffraction shows that $CF_{1.1}$ had no graphitic unsaturation.

EXAMPLE 23

$CF_{0.8}$ initiated HFP homopolymerization at 250° C. and 40,000 psi.

EXAMPLE 24

$SbF_5$ on $CF_{0.25}$ copolymerized $TFE/CF_2=CFOCF_3$ in HFP cyclodimer.

EXAMPLE 25

$SbF_5$ on graphite fibers copolymerized $TFE/CF_2=CFOCF_3$ in HFP cyclodimer.

EXAMPLE 26

High surface area coconut carbon was ineffective as a catalyst for $TFE/CF_2=CFOCF_3$ copolymerization at 80° C.

EXAMPLE 27

Coke Intercalated with $F_2$ as Initiator

A 2.0-g sample of Conoco coke into which 0.3 wt-% of fluorine gas had been intercalated at 25° C. was charged to a 240-mL Hastelloy tube along with 50 mL of hexafluoropropene cyclic dimer and 5 g (0.50 mol) of tetrafluoroethylene. Reaction was carried out at 25° C. for 4 hr, then 60° C. for 8 hr, and finally 200° C. for 4 hr. Pressure drop from polymerization of TFE occurred mainly at 25° C. The crude product mixture was pulverized in a blender with 300 mL of methanol, filtered, and the filter cake was then rinsed with 100 mL of methanol and dried for 4 hr at 100° C. (0.2 mm) to afford 41.7 g of dark grey polymer. Analysis by TGA found no weight loss to 500° C. while DSC showed mp 327.0° C. for polytetrafluoroethylene.

EXAMPLE 28

Tetrafluoroethylene/perfluoro(propyl vinyl ether) Copolymer with Fluorinated Graphite Fiber as Initiator A 240-mL Hastelloy tube charged with 5.0 g of graphite fibers fluorinated to the 4.5% F level, 50 mL of hexafluoropropene cyclodimer, 10 g (0.038 mol) of perfluoro(propyl vinyl ether), and 25 g (0.25 mol) of tetrafluoroethylene was heated at 80° C. for 16 hr. The crude product was blended with 200 mL of methanol and filtered, and the filter cake was washed twice with 100 mL of methanol. The black solid weighed 5.6 g after drying at 100° C. (0.1 mm). TGA: 9.4% weight loss to 586° C. with the curve leveling. DSC: no transitions detected, indicating incorporation of an appreciable percentage of the fluorovinyl ether.

EXAMPLE 29

Polymerization of Methyl Methacrylate with $CF_{0.8}$ Fluorographite as Initiator A 70-mL heavy-walled glass tube charged under $N_2$ with 0.5 g of commercial $CF_{0.8}$ and 10 mL of inhibited methyl methacrylate was sealed and heated at 80° C. for a total of 12 hr, after which the contents were too viscous to pour out. A sample of polymer was obtained by extraction with ethyl acetate and evaporation of solvent, affording 2.1 g of a stiff, black film.

EXAMPLE 30

$CCl_4/CH_2=CH_2$ Telomers with $CF_{1.08}$ as Initiator 156 g of $CCl_4$, 4 g of fluorinated coke $CF_{1.08}$ and 6 g of ethylene was used. The reaction vessel was shaken at 150° C. After 16 h, the shaker tube was unloaded and the reaction mixture was filtered. There was recovered 4.4 g of initiator and 148.9 g of mixture (GC data, wt. %) $CCl_4$ (84.2), $CCl_3CH_2CH_2Cl$ (9.12), $CCl_3(CH_2CH_2)_2Cl$ (6.29), $CCl_3(CH_2CH_2)_3Cl$ (0.26).

TABLE I

Fluoropolymers from Carbon-based Initiators

| Example | Monomer(s)[1] | Initiator | Medium | Max. Pressure (psi) | Temp. (° C.) | Weight (g) | MP (° C.) | Wt. Loss Onset (° C.) |
| --- | --- | --- | --- | --- | --- | --- | --- | --- |
| 16 | | 2 g 30% $SbF_5$ on $(CF_{0.25})_n$ | F-n-hexane | 140 | exotherm 65 | 53.9 | 329.7 | 450 |
| 17 | 50 g TFE | 2 g $(CF_{0.25})_n$ | F-n-hexane | 100 | 20–30 | 52.8 | 329.3 | 450 |
| 18 | 50 g TFE | 2 g graphite | HFP cyclodimer | 215 | 25/6 hr, 80/4 hr | <0.1 | — | — |
| 19 | 50 g TFE | 2 g 30% $SbF_5$ on $(CF_{0.8})_n$ | $H_2O$ | 285 | 25 | 51.4 | — | — |
| 20 | 50 g TFE, 10 g $C_2H_4$ | 2 g $(CF_{0.8})_n$ | HFP cyclodimer | 1435 | 100–120 | 3.0 | 268.9 | ~300 |
| 21 | 50 g TFE | 1 g $(CF_{0.8})_n$ | — | 270 | exotherm 45 | 47.5 | 327.2 | 450 |
| 22 | 50 g TFE, 66 g PMVE | 2 g $(CF_{1.1})_n$ | HFP cyclodimer | 566 | 100 | 46.2 | none | 475 |
| 23 | 125 mL HFP (180 g) | 2 g $(CF_{0.8})_n$ | — | 40,000 | 250/3.6 hr | 13.7[2] | — | — |
| 24 | 50 g TFE, 66 g PMVE | 2 g 30% $SbF_5$ on $(CF_{0.25})_n$ | HFP cyclodimer | 438 | 80/12 hr | 54.9 | 293.3 | 475 |
| 25 | 50 g TFE, 66 g PMVE | 2 g 50% $SbF_5$ on graphite fibers | HFP cyclodimer | 538 | 80/12 hr | 53.9 | 302.3 | 475 |
| 26 | 50 g TFE, 66 g PMVE | 2 g dried coconut carbon | HFP cyclodimer | 772 | 80/12 hr | 0 | — | — |

[1]TFE is $CF_2=CF_2$, HFP is $CF_3CF=CF_2$, PMVE is $CF_2=CFOCF_3$.
[2]Identified as polyhexafluoropropene by $19_F$ NMR.

What is claimed is:

1. A telomerization process comprising telomerizing monomer compounds of the formula $X_2C=CYZ$, where X is H or F, Y is H, F or $CH_3$, where at least one of X and Y is F, and Z is H, F, $OR_F'$, Cl, $CH_2OH$, $R_F'$, R or $CO_2R'$ where $R_F'$ is perfluoroalkyl of 1 to 4 carbon atoms, R is alkyl of 1 to 4 carbon atoms, and R' is alkyl or polyfluoroalkyl of 1 to 4 carbon atoms with telogens of the structure RI, RBr or RCl, where R is selected from the group consisting of hydrocarbyl or polyhaloalkyl, in the presence of fluorinated carbon catalyst, in the absence of Lewis acid, in the optional presence of a solvent.

2. The telomerization process of claim 1 wherein the monomers are selected from $CF_2=CF_2$, $CF_2=CFCl$, $CF_2=CHF$, $CF_2=CH_2$, $CH_2C=(CH_3)CO_2CF_3$, $CH_2=CHC_4F_9$, and $CH_2=CHCO_2CH(CF_3)_2$.

3. The process of claim 1 wherein the wherein the fluorinated carbon is a fluorographite and the monomer compound is tetrafluoroethylene.

4. The process of claim 3 wherein the fluorinated carbon is a fluorographite.

5. Process according to claim 4 wherein the reaction temperature is about −10° C. to about 250° C.

6. The process of claim 5 wherein the reaction temperature is about −10 to about 120° C.

7. The process of claim 1 wherein the telogen is selected from the group consisting of $CF_3CF_2I$, $CF_3CF_2CF_2I$, $F(CF_2)_4I$, $C_2F_5I$, $F(CF_2)_6I$, $F(CF_2)_8I$, $(CF_3)_2CFI$, $BrCF_2CFClBr$, $CF_2Br_2$, $CCl_4$, $CF_3OCF_2CF_2I$, $C_3F_7OCF_2CF_2I$, $ClCF_2CFClI$, $I(CF_2)_3I$, $I(CF_2)_4I$ and $BrCF_2CF_2Br$.

8. The process of claim 1 wherein the telogen is $F(CF_2)_nI$ where n is 2 to 8, and the monomer is TFE.

9. The process of claim 1 wherein the reaction temperature is 25 degrees to 150 degrees C.

10. The process of claim 3 wherein the wherein the fluorinated carbon is a fluorographite or flurographite intercolated with $SbF_5$, the monomer compound is tetrafluoroethylene and the telomer is RI.

11. The process of claim 3 wherein the wherein the fluorinated carbon is a fluorographite, the monomer compound is tetrafluoroethylene and the telomer is RI.

* * * * *